3,558,685
SUBSTITUTED THIOL CARBAMATES
Hans Osieka and Karl-Heinz Koenig, Ludwigshafen (Rhine), Adolf Fischer, Mutterstadt, Pfalz, and Erich Flickinger, Frankweiler, Germany, assignors to Badische Anilin- & Soda-Fabrik Aktiengesellschaft, Ludwigshafen (Rhine), Germany
No Drawing. Filed Feb. 20, 1968, Ser. No. 706,781
Claims priority, application Germany, Mar. 9, 1967, P 16 42 218.7
Int. Cl. C07c 155/08; A01n 9/12
U.S. Cl. 260—455                  2 Claims

ABSTRACT OF THE DISCLOSURE

Substituted N-isobutynylthiol carbamates and methods for controlling unwanted plants with same without injuring crop plants.

---

The present invention relates to substituted N-isobutynylthiol carbamates and herbicides containing said compounds as well as methods of controlling unwanted plants with said compounds.

It is known that 2,3,4-trichloroallyl-N,N-diisopropylthio carbamate may be used for controlling unwanted plants in crops such as barley, wheat, Indian corn and beets (British Patent Specification 882,110).

An object of this invention is to provide new valuable substituted N-isobutynylthiol carbamates. Another object of the invention is to provide a method of controlling unwanted plants with these compounds without injuring the crop plants.

These and other objects of the invention are achieved with compounds having the formula

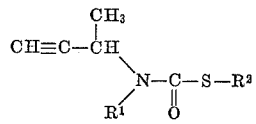

in which $R^1$ denotes an aliphatic radical and $R^2$ denotes an aliphatic radical which may contain one or more halogen atoms or hydroxyl groups as substituents.

Compared with 2,3,3 - trichloroailyl-N,N-dissopropylthiol carbamate they are better tolerated by plants while sometimes having similar and often better herbicidal action.

The active ingredients may be simply prepared, for example by reacting a carbamyl chloride suitably substituted on the nitrogen atom with a suitable mercaptan.

Preparation of 2,3,3-trichloroallyl-N-butyn - 1 - yl-3-isopropylthiol carbamate having the formula

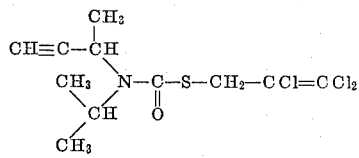

17.4 parts by weight of N-butyn - 1-yl-3-N-isopropylcarbamyl chloride is dripped into 17.8 parts by weight of 2,3,3-trichloroalkylmercaptan in the presence of 10.1 parts by weight of triethylamine while stirring at 18° to 25° C. The whole is heated at 65° C. for three hours, the reaction mixture is cooled and suction filtered leaving the triethylamine hydrochloride, the filtrate is dissolved in ether, washed first with dilute sodium bicarbonate solution and then twice with water, dried with calcium chloride, and the substituted thiol carbamate is distilled off; B.P.$_{0.2}$=126° C., yield=85% of the theory. The refractive index of the product is $n_D^{25}$=1.5390.

The following compounds can be prepared by the same method:

2-methyl-3,3-dichloroallyl-N-butyn-1-yl-3-N-isopropylthiol carbamate B.P.=121° C. (0.3 mm.) $n_D^{20}$=1.5219
ethyl-N-butyn-1-yl-3-N-methylthiol carbamate B.P.=130° C. (25 mm.) $n_D^{25}$=1.5059
2,3,3-trichloroallyl-N-butyn-1-yl-3-N-methylthiol carbamate B.P.=119° C. (0.1 mm.) $n_D^{25}$=1.5509
2-methyl-3,3-dichloroallyl-N-butyn-1-yl-3-N-methylthiol carbamate B.P.=114° C. (0.1 mm.) $n_D^{25}$=1.5370
2,3,3-trichloroallyl-N-butyn-1-yl-3-N-propylthiol carbamate B.P.=138° C. (0.3 mm.) $n_D^{25}$=1.5400
ethyl-N-butyn-1-yl-3-N-isopropylthiol carbamate B.P.=50° to 60° C. (0.1 mm.) $n_D^{25}$=1.4901
butyl-N-butyn-1-yl-3-N-propylthiol carbamate B.P.=99° to 100° C. (0.3 mm.) $n_D^{25}$=1.4899
2-methyl-3,3-dichloroallyl-N-butyn-1-yl-3-N-propylthiol carbamate B.P.=132° C. (0.3 mm.) $n_D^{25}$=1.5256
isobutyl-N-butyn-1-yl-3-N-methylthiol carbamate B.P.=63° to 64° C. (0.1 mm.) $n_D^{25}$=1.4907
isopropyl-N-butyn-1-yl-3-N-isopropylthiol carbamate B.P.=78° C. (0.3 mm.) $n_D^{25}$=1.4919
β-hydroxyethyl-N-butyn-1-yl-3-N-isopropylthiol carbamate B.P.=128° C. (0.2 mm.) $n_D^{25}$=1.5157
2,3-dichloroallyl-N-butyn-1-yl-3-N-isopropylthiol carbamate B.P.=106° C. (0.1 mm.) $n_D^{23}$=1.5390
2,3,3-trichloroallyl-N-butyn-1-yl-3-N-butylthiol carbamate B.P.=110° to 111° C. (0.2 mm.) $n_D^{23}$=1.5391
2-methyl-3,3-dichloroallyl-N-butyn-1-yl-3-N-butylthiol carbamate B.P.=116° to 118° C. (0.1 mm.) $n_D^{23}$=1.5280
2,3-dichloroallyl-N-butyn-1-yl-3-N-propylthiol carbamate B.P.=103° to 105° C. (0.1 mm.) $n_D^{23}$=1.5252.

The herbicides according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. The herbicides may also be applied in granulated form.

The herbicides according to this invention may be added to insecticides, fungicides, bactericides or other herbicides or may be mixed with fertilizers.

Dusts may be prepared by mixing or grinding the active ingredients with a solid carrier.

The following example illustrates the application of the agents according to this invention.

EXAMPLE

In a greenhouse pots with a diameter of 8 cm. were filled with loamy sandy soil and then seeds of Indian corn (Zea mays), barley (Hordeum vulgare), wheat (Triticum vulgare), beet (Beta vulgaris), wild oats (Avena fatua), slender foxtail (Alopecurus myosuroides), silky bent grass (Agrostis spica venti) and annual meadow grass (Poa annua) were sown therein. The soil prepared in this way was sprayed with 2,3,3-trichloroallyl - N - isopropyl-N-butyn-1-yl-3-thiol carbamate (I) and, for comparison, with 2,3,3 - trichloroallyl-N,N-diisopropylthiol carbamate (II), each at the rate of 2 kg. of active ingredient per hectare emulsified in 500 liters of water, and the uppermost layer of the soil was incorporated shallowly. After three to four weeks it was observed that the crop plants tolerated I better than II.

The results of the experiment can be seen from the following table:

|  | Active ingredient | |
|---|---|---|
|  | I | II |
| Crop plants: |  |  |
| Indian corn | 0 | 10–20 |
| Barley | 0 | 10–20 |
| Wheat | 0 | 10–20 |
| Beet | 0 | 10 |
| Unwanted plants: |  |  |
| Wild oats | 100 | 90–100 |
| Slender foxtail | 90–100 | 90–100 |
| Silky bent grass | 90–100 | 90 |
| Annual meadow grass | 90–100 | 90–100 |

NOTE.—0=no injury; 100=complete kill.

The following compounds have the same biological action as I:

2,3,3-trichloroallyl-N-butyn-1-yl-3-N-propylthiol carbamate
2,3-dichloroallyl-N-butyn-1-yl-3-N-isopropylthiol carbamate
2,3-dichloroallyl-N-butyn-1-yl-3-N-propylthiol carbamate
2-methyl-3,3-dichloroallyl-N-butyn-1-yl-3-N-isopropylthiol carbamate
2-methyl-3,3-dichloroallyl-N-butyn-1-yl-3-N-propylthiol carbamate
2,3,3-trichloroallyl-N,N-bis(butyn-1-yl-3-N)-thiol carbamate
isobutyl-N-butyn-1-yl-3-N-methylthiol carbamate
isopropyl-N-butyn-1-yl-3-N-isopropylthiol carbamate
methyl-N-butyn-1-yl-3-N-isopropylthiol carbamate
n-pentyl-N-butyn-1-yl-3-N-isopropylthiol carbamate
2,3-dichloroallyl-N-butyn-1-yl-3-N-n-pentylthiol carbamate
ethyl-N-butyn-1-yl-3-N-methylthiol carbamate
propyl-N-butyn-1-yl-3-N-isopropylthiol carbamate
butyl-N-butyn-1-yl-3-N-propylthiol carbamate
2-methyl-3,3-dichloroallyl-N-butyn-1-yl-3-N-butylthiol carbamate
propyl-N-butyn-1-yl-3-N-methylthiol carbamate.

We claim:
1. A compound having the formula

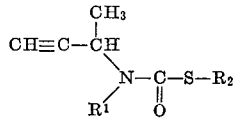

wherein $R^1$ is an alkyl group having 1–5 carbon atoms and $R^2$ is 2,3,3-trichloroallyl.

2. A compound having the formula

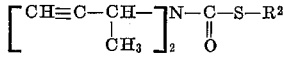

wherein $R^2$ is an alkyl group having 1 to 5 carbon atoms, β-hydroxyethyl, 2,3-dichloroallyl, 2,3,3-trichloroallyl, or 2-methyl-3,3-dichloroallyl.

References Cited
UNITED STATES PATENTS

| 3,235,368 | 2/1966 | Sargant | 260—455X |
| 3,298,817 | 1/1967 | Tilles | 260—455X |

LEWIS GOTTS, Primary Examiner

D. G. RIVERS, Assistant Examiner

U.S. Cl. X.R.

71—100; 260—544